United States Patent [19]

Cellini

[11] Patent Number: 5,152,688
[45] Date of Patent: Oct. 6, 1992

[54] FUEL TRAINING APPARATUS UTILIZING A HIGH FLASH POINT FUEL SUBSTITUTE

[75] Inventor: Santo Cellini, East Haven, Conn.

[73] Assignee: United Technologies Corporation, Hartford, Conn.

[21] Appl. No.: 712,294

[22] Filed: Jun. 10, 1991

[51] Int. Cl.⁵ .............................................. G09B 9/00
[52] U.S. Cl. ........................................ 434/29; 434/33; 434/54; 244/135 R; 364/578; 340/945
[58] Field of Search ............... 434/29, 33, 49, 53, 434/54, 126; 244/135 R, 117 A, 163; 73/1 H, 861.03; 340/602, 620, 945; 250/303; 364/578, 442

[56] References Cited

U.S. PATENT DOCUMENTS 3,176,413  4/1965  Dornier et al. ..................... 434/33
3,950,740  4/1976  Greene ................................ 340/602
4,273,304  6/1981  Frosch et al. ................... 244/117 A
4,478,038  10/1984  Cropper et al. ................... 434/54 X
4,601,663  7/1986  Allison et al. ......................... 434/33
4,848,133  7/1989  Paulis et al. ......................... 73/1 H
4,918,619  4/1990  Orloff et al. ..................... 340/945 X Primary Examiner—Richard J. Apley
Assistant Examiner—Joe H. Cheng
Attorney, Agent, or Firm—Russell M. Lipes, Jr.

[57] ABSTRACT

A trainer for the fuel system of an aircraft such as a helicopter which has full-scale aircraft and fuel system components for training in the operation and maintenance of the fuel system and which uses a fuel substitute which has a higher flashpoint and does not have the odor of aircraft fuel, but does have the specific gravity, dielectric constant and viscosity of aircraft fuel.

5 Claims, 1 Drawing Sheet

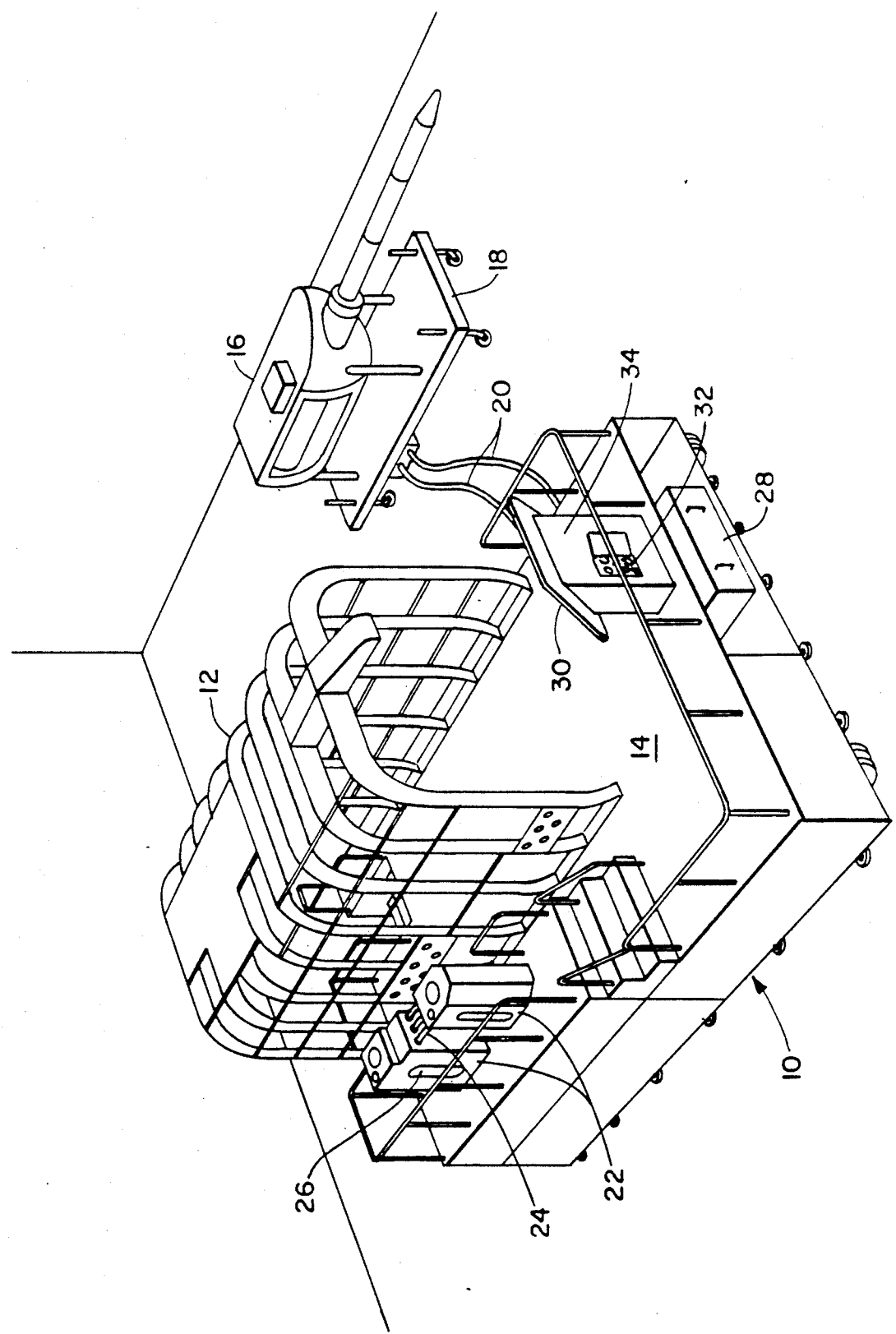

FUEL TRAINING APPARATUS UTILIZING A HIGH FLASH POINT FUEL SUBSTITUTE

TECHNICAL FIELD

This invention relates to aircraft fuel system training apparatus.

BACKGROUND ART

In connection with aircraft such as helicopters, it is important to train pilots and maintenance personnel in the various operational, maintenance and service aspects of the aircraft and its systems. It is known to prepare various mockup and demonstrative apparatus and displays, sometimes of a reduced scale and frequently not to any scale, of the structure or systems of the aircraft.

Fuel system training apparatuses are utilized to provide practical experience in the operation, maintenance practices and fault isolation techniques of aircraft fuel systems. They are particularly useful for teaching the operation of aircraft fuel systems because the entire system is recreated with actual components which are located and operated the same as in the aircraft. Exemplary tasks for which the fuel training systems are utilized are instruction on refuel probe control, pressure refueling, defueling, fuel transfer, dumping, mission fueling, purging, fuel quantity indicating, engine fuel supply/priming, trouble-shooting, component removal/insulation, calibration and rigging.

Training apparatuses are designed to resemble the actual fuel containment and transfer systems of the applicable aircraft. Thus, they duplicate as closely as possible the actual conditions and systems that exist on an aircraft. Typically, a fuel training apparatus comprises at least two fuel tanks or cells connected by fuel lines and pumps for transferring the fuel between the tanks. In addition, the fuel system contains the visual indicators, switches, hardware and components necessary to accurately simulate the fuel system.

In order to closely simulate onboard fuel systems, conventional fuel training systems utilize actual aircraft fuel. This, for example, results in an accurate duplication of fuel transfer rates. However, the use of this fuel while desirable, has been found to be disadvantageous because of its relatively low flash point and particularly because of its odor. The low flash point creates a safety problem and in classrooms the odor is distracting and disturbing to many persons. Because of the fire and odor problems with state-of-the-art aircraft fuel system training equipment, there is a considerable amount of such equipment, representing many thousands of dollars, which is stored or has limited use because of the danger to personnel.

DISCLOSURE OF THE INVENTION

An object of the present invention is the provision of a full-scale helicopter fuel system operational and maintenance trainer which closely simulates the helicopter and its fuel system.

Still another object of the invention is the provision of a helicopter fuel system trainer which uses a synthetic fuel which has essentially the specific gravity, dielectric constant and viscosity of aircraft fuel without its relatively low flash point and odor.

The foregoing and other features and advantages of the present invention will become more apparent from the following description and accompanying drawing.

BRIEF DESCRIPTION OF DRAWING

FIG. 1 illustrates a schematic of an exemplary fuel system training apparatus.

BEST MODE FOR CARRYING OUT THE INVENTION

FIG. 1 shows a full-scale fuel system trainer for an actual helicopter model. Main trainer unit (10) includes a portion of a helicopter fuselage frame (12) mounted on platform (14). The skin has not been applied to the fuselage frame so as not to interfere with the training procedure. In addition to the main trainer unit, refuel probe unit (16) mounted on wheeled cradle (18) is connected to the main unit by electrical/pneumatic lines (20).

The trainer is utilized to instruct and provide practical experience to students in the operation and maintenance of the helicopter fuel system. The trainer includes the right hand side of the fuel system with components installed in locations and with respect to each other as they would be on the helicopter. While left hand side fuel tanks and connections to the fuselage frame are not included, the left side of the fuel system is represented whenever possible and convenient.

Two fuel tanks or cells (22) representing the helicopter's right side tanks are mounted on main trainer unit (10) in this actual location in the helicopter with respect to the fuselage. The heights of the tanks are identical to the actual tanks so that aircraft gaging system tank units can be used, but for training convenience the horizontal lengths are reduced. The tanks are connected by fuel lines (24) and each tank has a side window (26) for observing the fuel and system components within such as pumps and level sensing probes as well as the rise and fall of fuel during operation. Fuel storage tank (28) is located in the base of main trainer unit (10) under platform (14). The storage tank has connecting fuel lines, not shown, to the two fuel tanks.

The fuel system is complete and operational. All lights, visual indicators, switches and other hardware for operating the fuel system are located on control panel (30) which simulates the aircraft instrument panel. Its location on the trainer unit is such that a number of students may observe as well as participate in its operation and functioning. An instructor's panel (32) is located on the outer face of support (34) for control panel (30). Here the instructor may inject faults and problems into the fuel system for solution by and training of students.

Pressurized fuel is supplied from storage tank (28) to the fuel system and tanks (22). The tanks may be filled or drained simultaneously or by individual selection. Fuel also may be supplied to the refuel probe unit (16). The pumps, valves and other mechanisms and subsystems for the fuel system are included in the trainer unit.

Actual aircraft type fuel such as JP4/5 is not used in the fuel system of the trainer because its low flashpoint is dangerous to students and instructors and because its odor is obnoxious. Instead, a substitute liquid is used that has a flashpoint high enough to provide a safe level of operation for the fuel system training apparatus. Typically, this flashpoint is above about 200° F. because this provides a significant degree of safety (i.e., O.S.H.A. Class IIIB). It is preferred that the liquid have similar physical properties to the fuel for which it substitutes. Thus, it is preferred that the liquid have a specific gravity of about 0.839 to about 0.855, a dielectric constant of about 2.185 to about 2.210 and a viscosity of about 14.2 to about 17.0. It is also preferred that the transfer rates for the liquid, the lubrication function, and the color are substantially the same as for the explosive aircraft fuel. These properties result in the substitute fuel liquid accurately and realistically simulating the potentially explosive fuel actually used in the aircraft.

Generally, liquid compositions that are a combination of saturated aliphatic and alicyclic hydrocarbons having the above-identified properties provide the high flashpoint that is desired in this invention. In addition, conventional dyes may be used to simulate the color of fuel without altering the desired properties of the substitute fuel. An example of a conventional dye is orange beta carotene available from food dye producers. Powder form Solvoil yellow No. 170 dye available from Chemserve Corporation, Detroit, Michigan is suitable. An exemplary substitute fuel having the above-desired properties is a "baby oil" substance such as SEMTOL 85 (TM) oil available from Witco Chemical Corporation and PENRECO (TM) white mineral oil available from Pennzoil Products Company.

The fuel system trainer is operated with actual fuel system components which are located on the trainer and operated the same as on the aircraft. Because of its full-scale size, it is easily accessible for hands-on training by a plurality of students. The trainer provides for student instruction in the basic fueling of the fuel tanks as well as operation of the refuel probe system although the ability to refuel from the probe is not present. It also provides for instruction in defueling or draining the fuel tanks, in transferring fuel between the right hand tanks, in purging the fuel system by compressed air, in dumping fuel from the right hand tanks, and in operation of the fuel quantity/low level warning system.

Although this invention has been shown and described with respect to detailed embodiments thereof, it will be understood by those skilled in the art that various changes in form and detail thereof may be made without departing from the spirit and scope of the claimed invention.

I claim:

1. An aircraft fuel system operational and maintenance trainer including platform means having a full-scale portion of a fuselage frame mounted thereon, a fuel system including fuel tanks mounted on said platform adjacent said fuselage frame in their normal position on an aircraft said tanks being of full-scale height, fuel storage tank means connected to said fuel tanks, control panel means mounted on said platform means, said control panel means including hardware means for operating the fuel system, instructor panel means also mounted on said platform means, said instructor panel means having means for injecting faults and problems into the fuel system, said fuel system being filled with a liquid having an homogeneous composition of saturated aliphatics and alicyclic hydrocarbons having the specific gravity, dielectric constant and viscosity properties of aircraft fuel, a flashpoint above 200° F. and the color of aircraft fuel.

2. An aircraft fuel system operational and maintenance trainer including platform means having a full-scale portion of a fuselage frame mounted thereon, a fuel system including at least two fuel tanks mounted on said platform adjacent said fuselage frame in their normal position on an aircraft, said tanks being of full-scale height and of reduced horizontal length, fuel storage tank means located under said platform means and connected to said fuel tanks, control panel means mounted on said platform means, said control panel means including hardware means for operating the fuel system, instructor panel means also mounted on said platform means, said instructor panel means having means for injecting faults and problems into the fuel system, said fuel system being filled with a liquid having an homogeneous composition of saturated aliphatics and alicyclic hydrocarbons having the specific gravity, dielectric constant and viscosity properties of aircraft fuel, a flashpoint above 200° F. and the color of aircraft fuel.

3. An aircraft fuel system operational and maintenance trainer in accordance with claim 2 in which the fuel system liquid has a specific gravity of about 0.839 to about 0.855, a dielectric constant of about 2.185 to about 2.210 and a viscosity of about 14.2 to about 17.0 and contains an orange beta carotene producing a yellow color.

4. An aircraft fuel system operational and maintenance trainer in accordance with claim 2 in which the fuel system liquid is a "baby oil" substance containing a powder form yellow dye.

5. An aircraft fuel system operational and maintenance trainer in accordance with claim 2 which has refuel probe means electrically and pneumatically connected to said trainer.

* * * * *